Feb. 5, 1952  F. W. KRUEGER  2,584,474
FOOD PROCESSING APPARATUS
Filed July 20, 1948  9 Sheets-Sheet 1
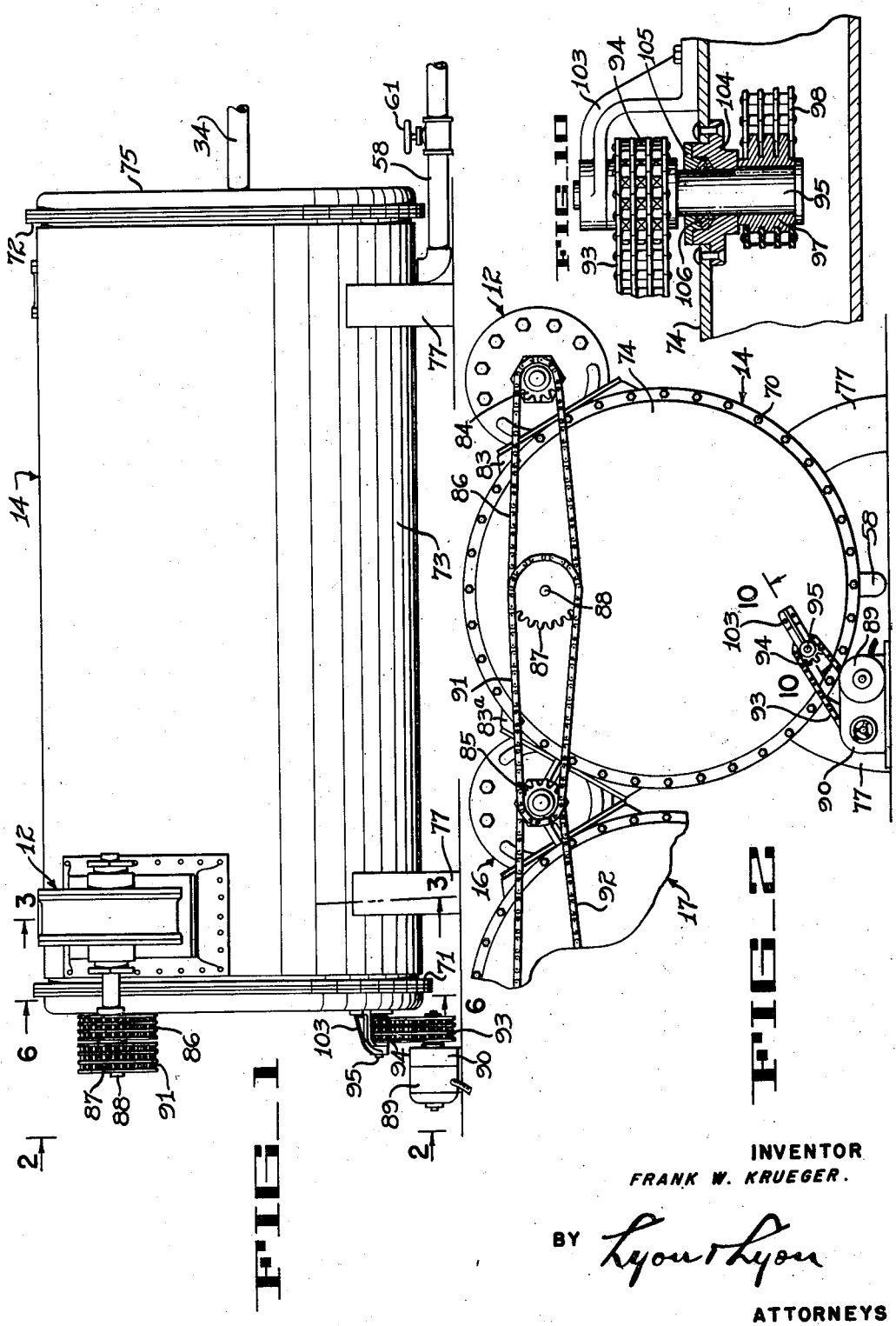
INVENTOR
FRANK W. KRUEGER.
BY Lyon & Lyon
ATTORNEYS

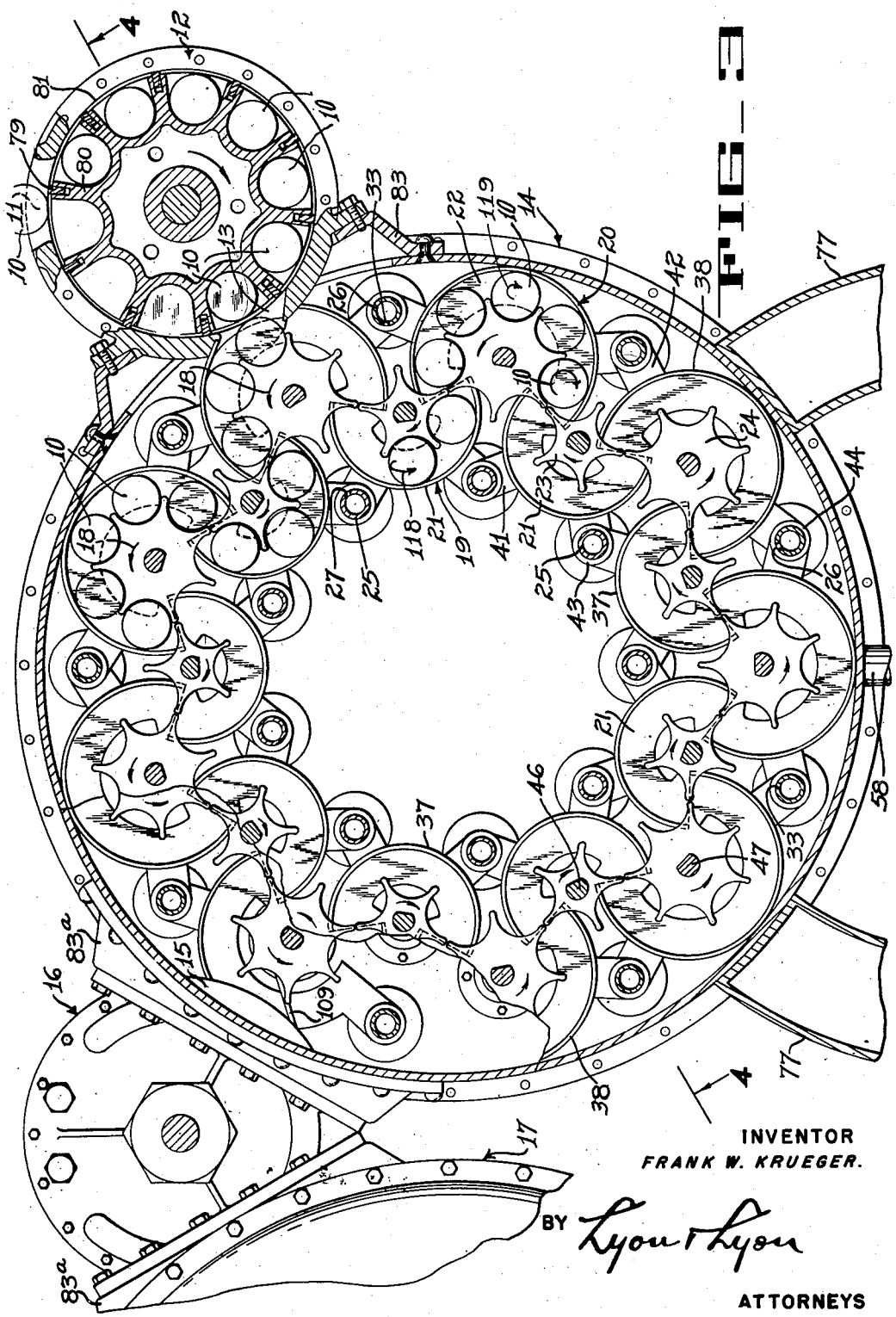

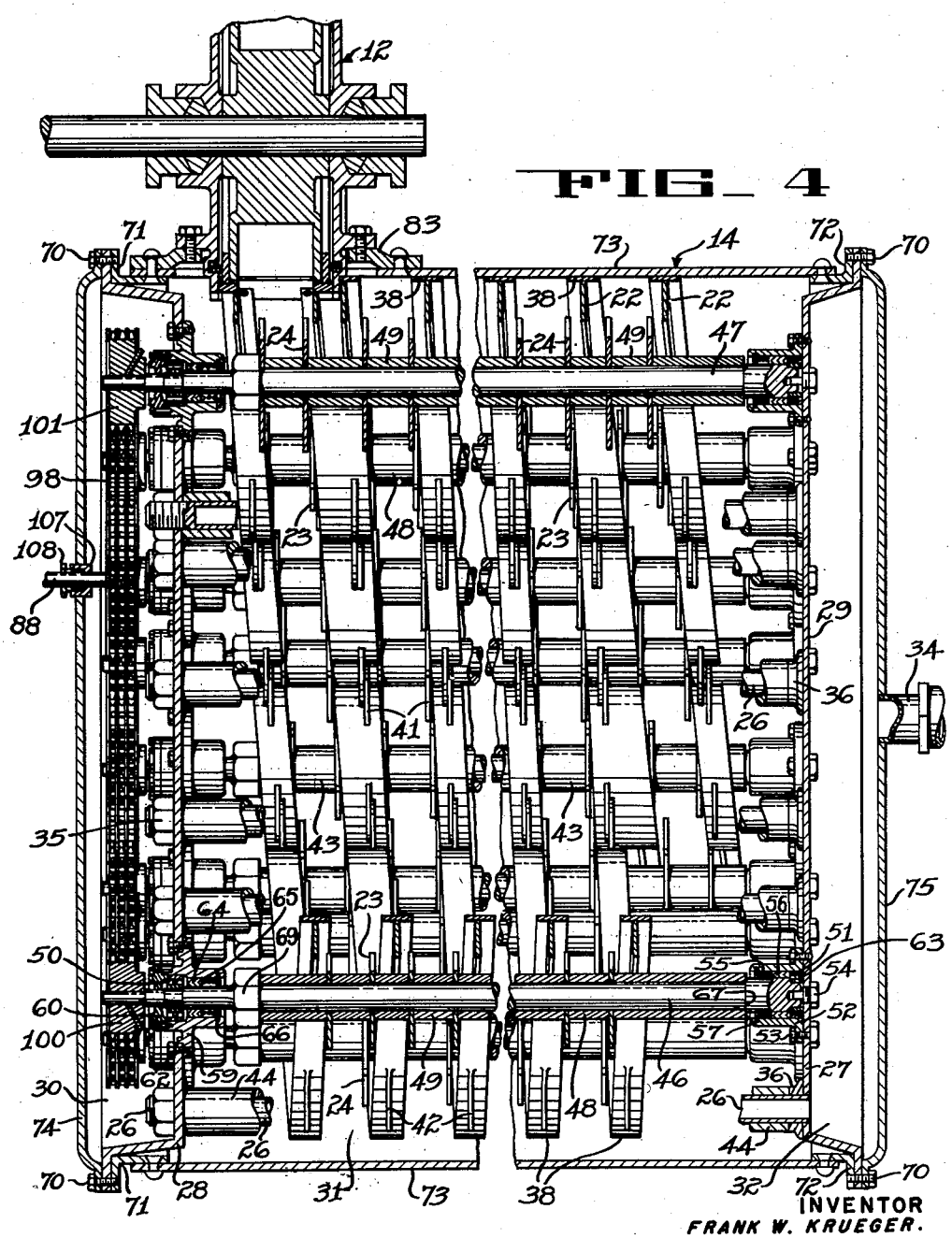

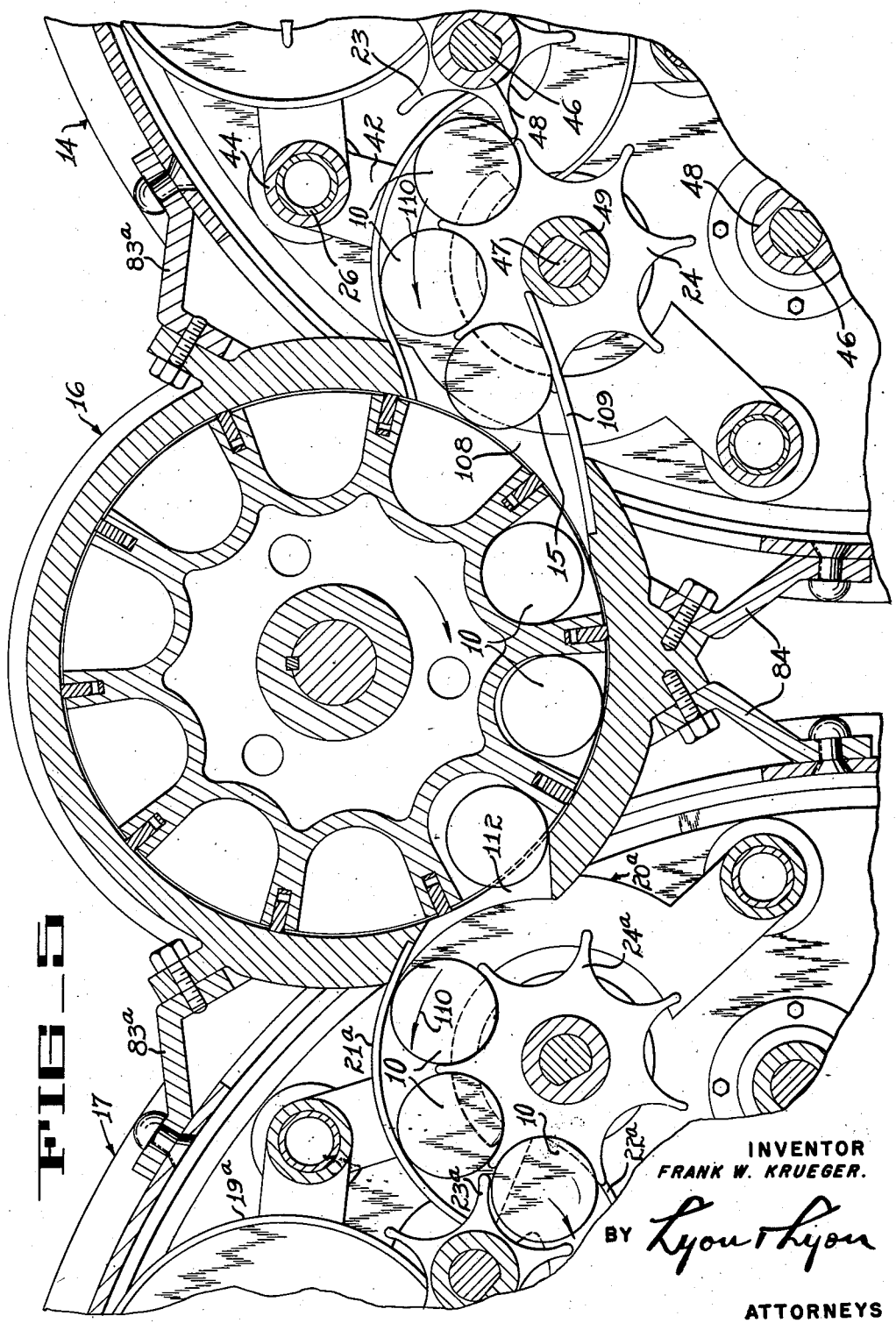

Feb. 5, 1952 F. W. KRUEGER 2,584,474
FOOD PROCESSING APPARATUS
Filed July 20, 1948 9 Sheets-Sheet 5
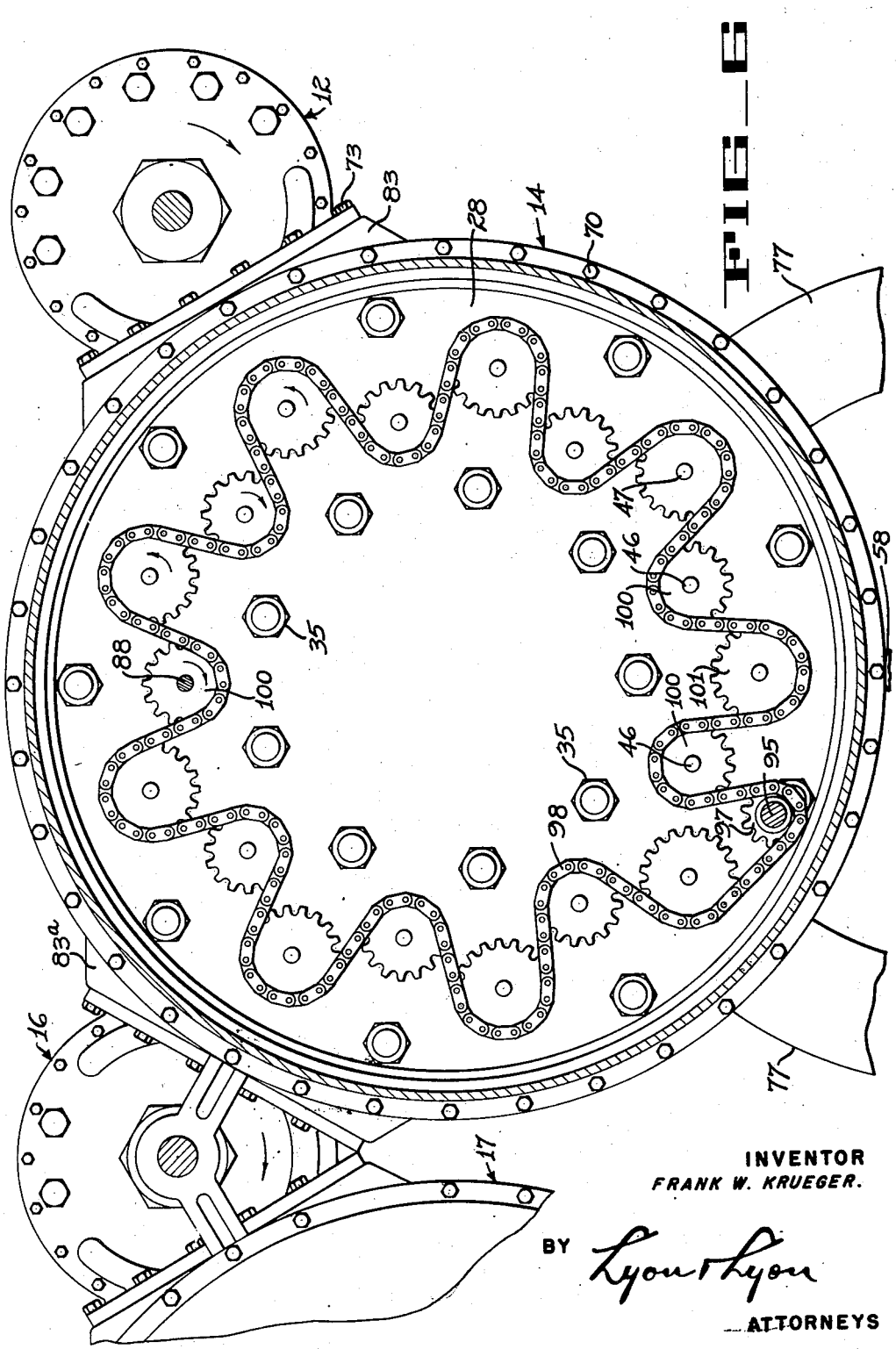
FIG_5
INVENTOR
FRANK W. KRUEGER.
BY *Lyon & Lyon*
ATTORNEYS

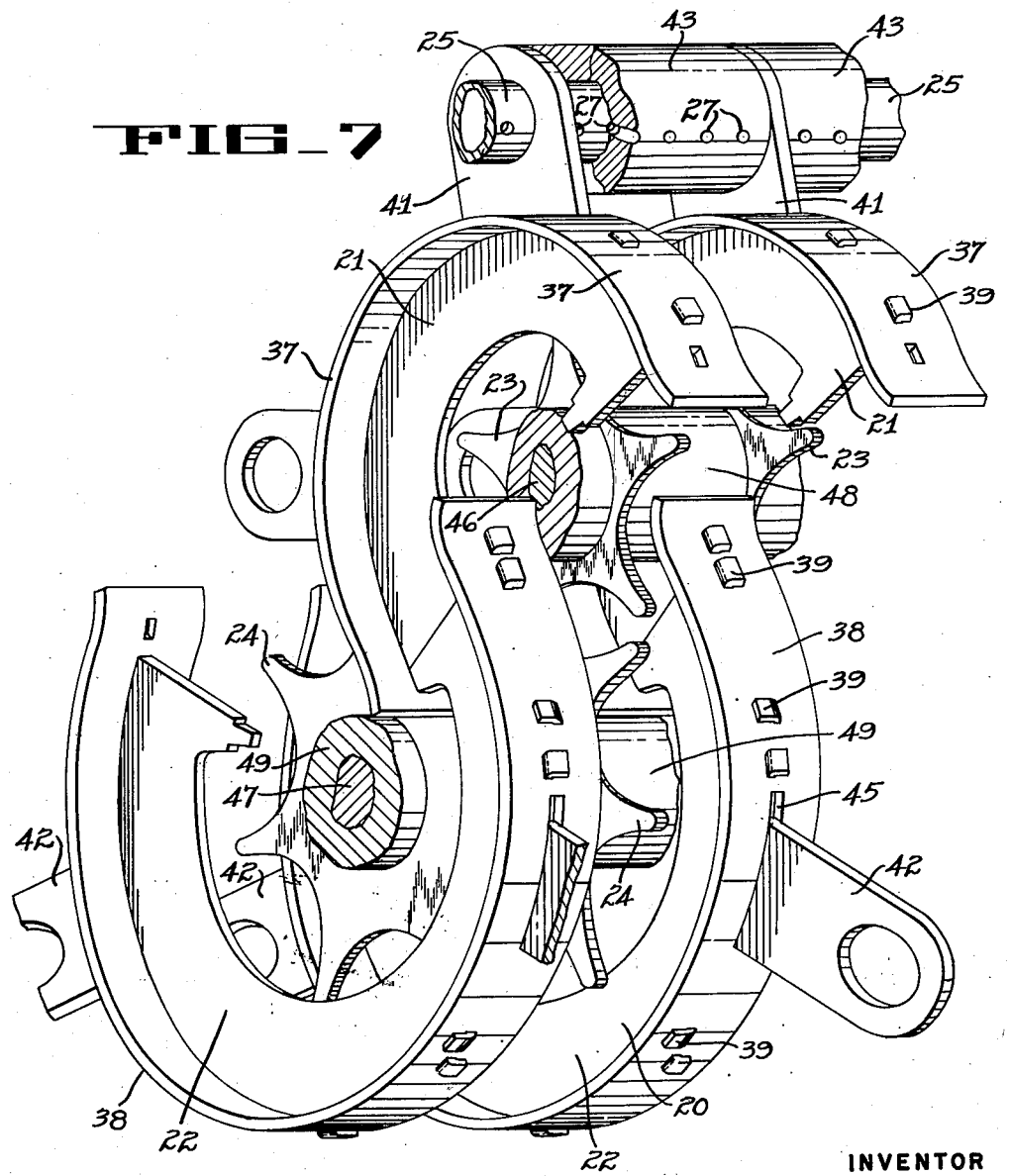

Feb. 5, 1952 F. W. KRUEGER 2,584,474
FOOD PROCESSING APPARATUS
Filed July 20, 1948 9 Sheets-Sheet 7
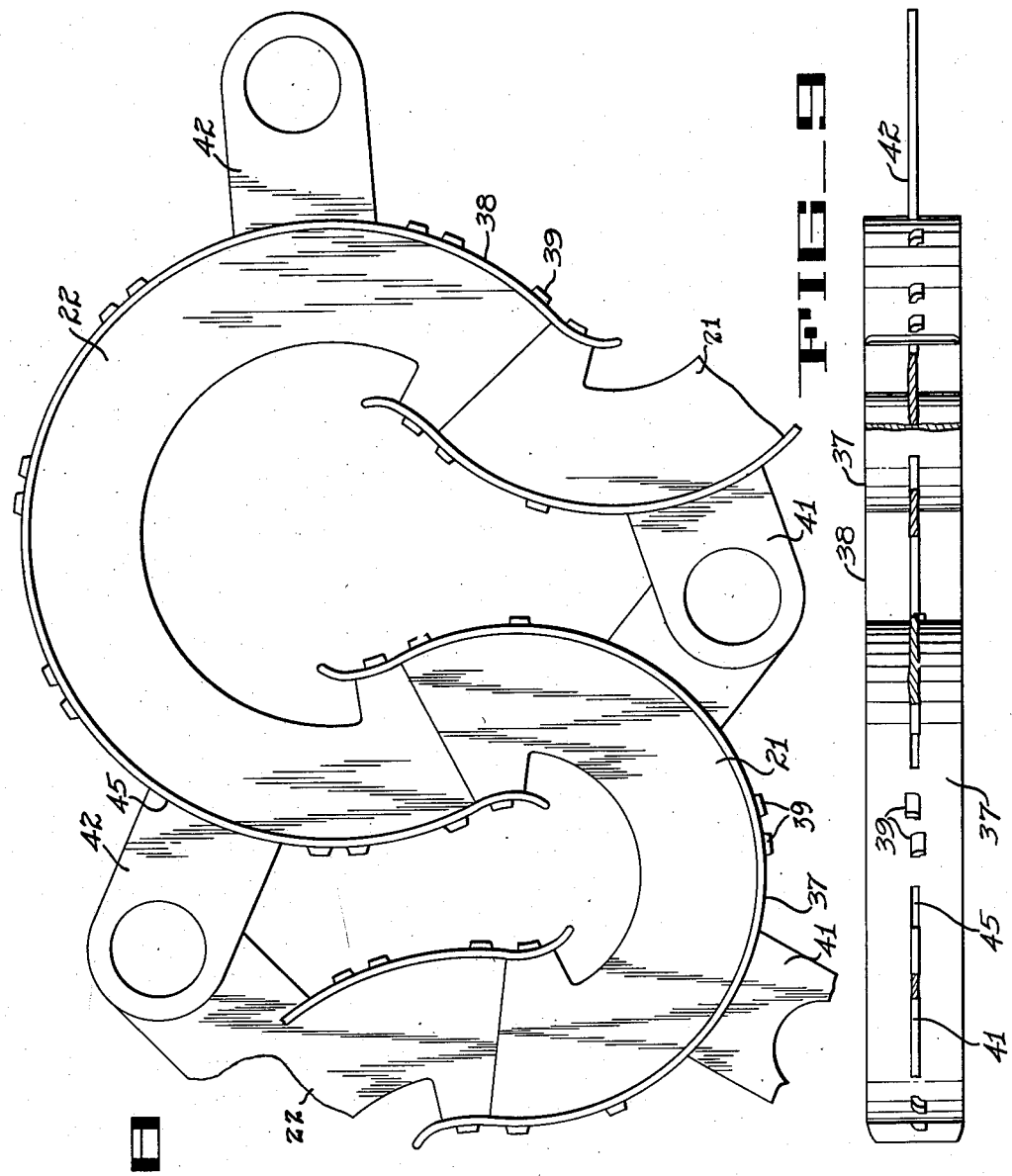
INVENTOR
FRANK W. KRUEGER.
BY Lyon & Lyon
ATTORNEYS

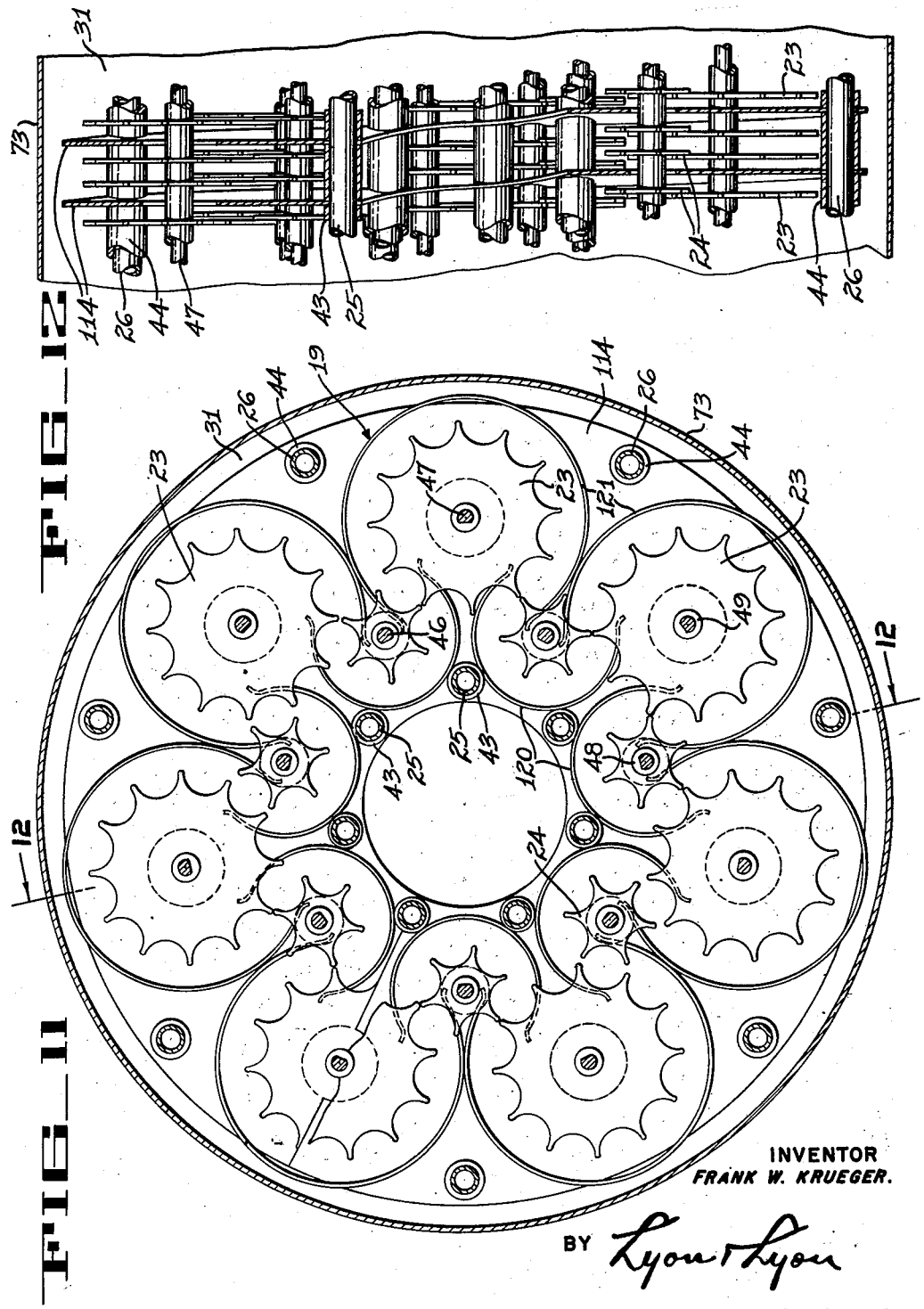

Feb. 5, 1952 F. W. KRUEGER 2,584,474
FOOD PROCESSING APPARATUS
Filed July 20, 1948 9 Sheets-Sheet 9
FIG_13
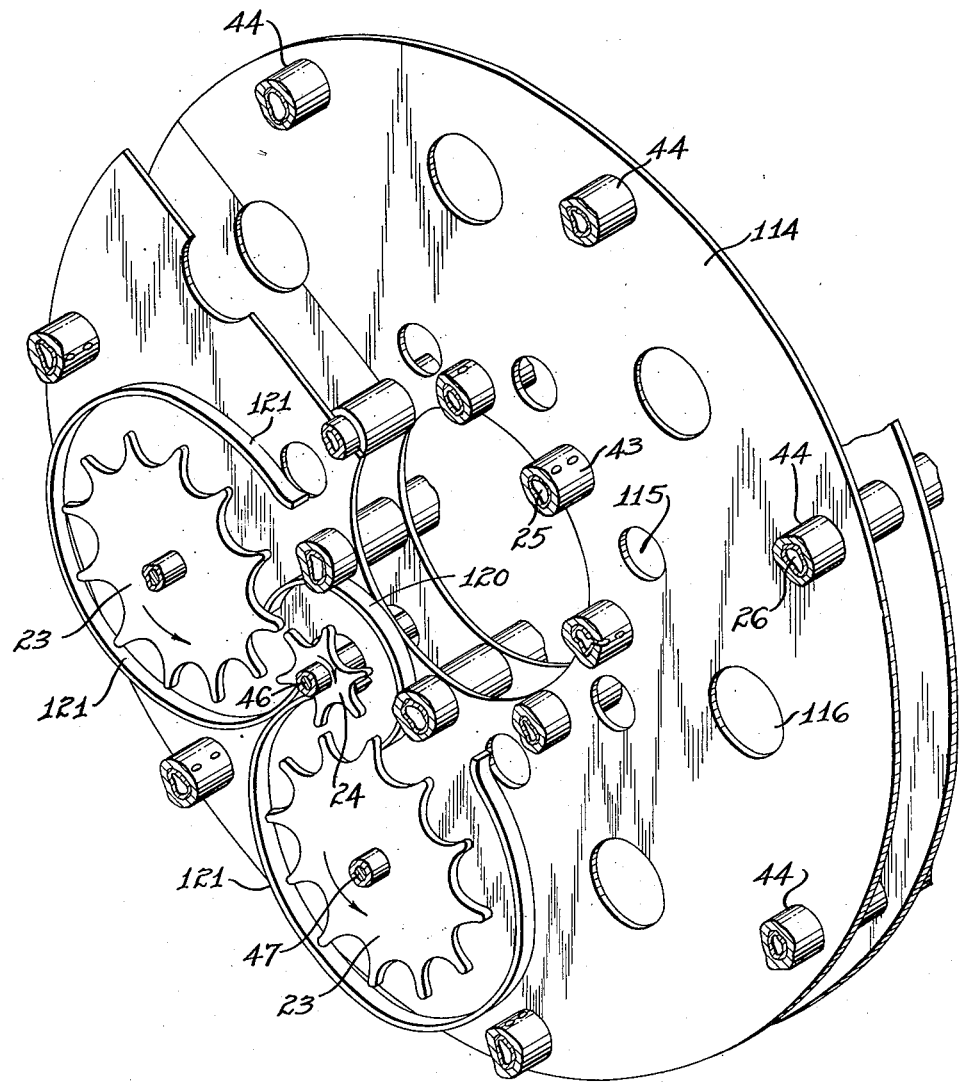
INVENTOR
FRANK W. KRUEGER.
BY *Lyon & Lyon*
ATTORNEYS Patented Feb. 5, 1952

2,584,474

UNITED STATES PATENT OFFICE 2,584,474

FOOD PROCESSING APPARATUS

Frank Wilhelm Krueger, Saratoga, Calif., assignor to Food Machinery and Chemical Corporation, San Jose, Calif., a corporation of Delaware Application July 20, 1948, Serial No. 39,773

20 Claims. (Cl. 99—360)

The present invention relates generally to that class of machines or apparatus in the canning art of the type known as cookers, coolers and the like in which food products such as fruit, vegetables, milk, meat, fish and other comestibles, in containers or cans, are subjected to a treating medium for heating, cooling, sterilizing and other effects during their slow and continuous passage through the machine or apparatus; and more specifically, but not necessarily limited thereto, to machines and apparatus of this specified type wherein simultaneously, a desired amount of rotation of the cans and agitation of the contents thereof occurs in such passage of the cans.

The present invention is not limited to sole use in cookers and coolers wherein the cans are rotated about their axes and their contents agitated while passing therethrough, but as demonstrated herein as well as in my copending U. S. patent application Serial No. 39,772 filed on even date herewith certain aspects of the present invention may be present in a so-called "vertical" type of cooker, cooler, exhaust box and the like wherein the cans in such passage are substantially devoid of such rotation and there is desired heat penetration along the longitudinal axes of the cans.

For the sake of simplicity and convenience, the present invention is described with reference to cookers and coolers though it is understood that the invention is not limited thereto, since certain aspects thereof are applicable generally to machines and apparatus, in the canning art, through which cans are carried for the purpose of treating their contents by the use of a suitable treating medium. Further, while the apparatus shown herein is of the closed or pressure type, certain aspects of the invention embodied in such apparatus may likewise be embodied in apparatus of the open or atmospheric type.

Further, even though the apparatus described herein is shown specifically in relationship only to cooker and cooler apparatus of the so-called horizontal type in which the can inlet and can outlet of the apparatus are necessarily spaced from one another in the horizontal direction, it is understood however that certain constructional features herein may be utilized in cookers or coolers of the vertical type as shown in my above mentioned copending application filed on even date herewith. It is understood, therefore, that the claims appended hereto, unless specifically limited to apparatus of the horizontal type are applicable likewise to apparatus of the vertical type. In other words, recourse may be had to the disclosure in my copending application in order to more fully understand and appreciate the range of equivalents and scope to which the appended claims are entitled and for that purpose, the disclosure in my above mentioned copending application is incorporated herein by this reference thereto.

Prior cookers, coolers, and the like, as exemplified in the Thompson U. S. Patent 2,363,818 incorporate a can carrying and guiding means arranged to move cans spirally through such cooker or cooler. In these prior arrangements, the cans are moved essentially only along the inside wall of a cylindrical shell housing these means. In accordance with some aspects of the present invention the cans travel not only adjacent to the inside surface of the cylindrical shell but also move radially inwardly and outwardly from and to the cylindrical shell to utilize more efficiently the interior space of the shell whereby: a longer can path results; the apparatus is more compact to obtain economical use of floor space without sacrifice of an extensive can path; the travel of the cans is smooth; more economical use of the heating medium results; and, under some conditions, a new desired motion is imparted to the cans to shorten the cooking period. The cans, in such case, move from the can inlet of the food treatment compartment, shell or chamber to the can outlet thereof in a spiral path of a plurality of convolutions, each convolution, in turn, having a plurality of curved adjoining sections, to impart a plurality of zigzag motions to a can in one convolution of travel around the shell.

The present invention relates particularly to machines of this character in which the means for advancing the cans through the cooler or cooker, as the case may be, is composed of a plurality of star wheels in which by their relative synchronous rotation, and the association of a directional co-operating canway or can guideway, move the cans successively and continuously from one star wheel to the next to achieve the desired motion.

While the cans are conveyed by a series of rotating star wheels and guided by suitable means in a zigzag path, they are subjected to a steam bath. Increased efficiency of operation is secured by causing the rotation or oscillation of the cans about their axis as they progress through the apparatus.

It is therefore an object of the present invention to provide an improved apparatus of the character described in which the can capacity per convolution is increased whereby its structure may be made more compact as compared with conventional constructions to thereby obtain the above-mentioned advantages.

A specific object of the present invention is to provide an improved apparatus of the character described in which a can in its movement therethrough is alternately rotated, about its axis, in a clockwise and in a counterclockwise direction to thereby provide improved agitation of the contents of the can with resulting improved heat penetration.

Another specific object of the present invention is to provide an improved apparatus of the character described which may accommodate in the order of three times as many cans per foot as present day apparatus of the same over-all dimensions.

Another specific object of the present invention is to provide improved apparatus of the character described characterized by the fact that the carrier structure, whereby a serpentine, tortuous, sinuous path of movement is imparted to the cans as they are moved spirally through the apparatus, is of relatively simple construction whose elements may be assembled in an expeditious manner.

Still another important specific object of the present invention is to provide improved apparatus of the character described wherein the cans are rotated alternately in different directions about their axes as the cans move from the can inlet to the can outlet thereof.

Another important specific object of the present invention is to provide apparatus of the character described wherein cans are fed from the can inlet to the can outlet thereof in a helicoidal path having a plurality of convolutions, each convolution comprising a plurality of adjoining curved sections for increasing the length of the helicoidal path whereby the apparatus may be made compact, and further, under some circumstances, to rotate the cans alternately in different directions about their axes as the cans move from its inlet to its outlet.

Another object of the present invention is to provide improved apparatus of the character described which may be used as either a horizontal cooker or cooler or as a vertical cooker or cooler, a subsidiary object being that substantially no rotative movement about the axis of a can is imparted to the can when the apparatus is used as a vertical cooker or cooler while a substantial rotative movement, alternately in the clockwise direction and counterclockwise direction, is imparted to the can, about its axis, when the apparatus is used as a horizontal cooker or cooler whereby such apparatus is adaptable for treatment of all types of comestibles.

Still another specific object of the present invention is to provide an improved cooker which permits the use of a fewer number of units for products requiring long cooking periods, such as fish and meat products.

Yet another specific object of the present invention is to provide improved apparatus of the character described for the subjection of the cans and their contents to any desired degree of temperature with a minimum amount of heating medium and at the same time to enable the cooking of such contents for any desired length of time with different amounts of agitation of such contents.

Still a further specific object of the present invention is to provide a cooker or cooler in which containers move in a serpentine, tortuous or sinuous path whereby the cooker or cooler may occupy a limited floor space.

Yet a further specific object of the present invention is to provide improved apparatus of the character described having a cylindrical outer shell in which containers are moved spirally in the direction of the longitudinal axis of the cylindrical shell with a characteristic tortuous, sinuous or serpentine movement in the radial direction of the shell.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of a cooker-cooler arrangement embodying the present invention.

Figure 2 is an end view of the same taken in the direction indicated by the arrows 2—2 in Figure 1 with a portion of the cooler broken away to avoid redundancy.

Figure 3 is a transverse sectional view taken substantially along the line 3—3 in Figure 1.

Figure 4 is a sectional view taken substantially along the line 4—4 in Figure 3.

Figure 5 is a transverse sectional view taken substantially along the line 6—6 in Figure 1.

Figure 6 is a sectional view taken substantially on the line 6—6 in Figure 1.

Figure 7 is an enlarged perspective view of a portion of the camway and associated star wheels.

Figure 8 is a plan view of a portion of the camway.

Figure 9 is a side view of the portion of the camway shown in Figure 8.

Figure 10 is a sectional view taken substantially along the line 10—10 of Figure 2.

Figure 11 is a sectional view through the center of a modified cooker structure embodying the present invention, showing the spiral can path in elevation.

Figure 12 is a sectional view taken substantially along the line 12—12 of Figure 11.

Figure 13 is a perspective view showing 1¾ convolutions of the spiral canway in the modified structure shown in Figures 11 and 12 but with all but three sprocket or star wheels and three can guides removed.

In the cooker, cooler arrangements shown herein, cans or containers 10 are fed consecutively and continuously by gravity to the can inlet opening 11 (Figure 3) of the rotary feed valve 12 whose outlet is in registry with the can inlet opening 13 of the cooker 14 from where they are carried in a tortuous, sinuous, or serpentine path, indicated by the arrows 18 having a plurality of helicoidal convolutions by a can carrier 19 embodying important features of the present invention to the can outlet opening 15 from where they are transferred by the rotary transfer valve 16 to the inlet of the cooler 17 from where, in turn, they are transferred by a carrier structure identical to that in the cooker 14 to the cooler outlet opening (not shown).

While in the cooker 14, the cans or containers 10 are subjected to steam under pressure by virtue of which the contents of the can are cooked, sterilized or otherwise treated in their passage between the inlet opening 13 and the outlet opening 15. These cans are then, in turn, cooled by transferring them, in conventional manner, while still under pressure through the rotary transfer valve 16 to a cooling bath in the cooler 17, as exemplified in the Thompson U. S. Patent 1,467,960.

The can carrier 19 which includes can propelling means in the nature of star wheels 23, 24 and stationary canway or can guide means 20 comprising inner and outer can end engaging strips 21 and 22, respectively, extends between the inlet opening 13 and the outlet opening 15 of the cooker. This can carrier 19 is of identical construction as the carrier 19A in the cooler 17 comprising star wheels 23A, 24A and stationary canway or can guide means 20A in the nature of inner and outer stationary can end engaging strips 21A and 22A, respectively, and for that reason a detailed description of the carrier 19 in the cooker 14 suffices to describe the identical one in the cooler 17. In the complete apparatus, the can carrier means 19, 19A in the cooker and the cooler, respectively, are operated in exact synchronism with the rotary feed valve 12 and rotary transfer valve 16 by chain drives, described later, thus enabling the complete apparatus to be operated as a unit with certainty and safety.

The can guide means, canway, or can guideway 20 (Figures 3 and 7) extending between the inlet opening 11 and outlet opening 15 defines a helicoidal can path having a plurality of convolutions, each convolution being defined by a plurality of oppositely disposed curved inner sections 21, 21 and a plurality of adjoining oppositely disposed curved outer sections 22, 22, it being noted that there is affixed to each can end engaging strip 21, 22 a corresponding inner arcuate can returning strip or rail 37, 38. In other words, these inner sections 21, 21 of the can guideway 20 are defined by a pair of oppositely disposed spaced inner can end engaging strips 21 each having an arcuate can retaining strip or rail 37 mounted thereon, and these outer sections 22, 22 of can guideway 20 are defined by the spaced pair of oppositely disposed can end engaging strips 22 each having an arcuate can retaining strip or rail 38 mounted thereon. It is noted that an intermediate strip 21 or 22 serves as an element of two such canway sections. Likewise, an intermediate rail 37, 38 serves as a can rail in two of such sections.

The can propelling means includes a pair of star wheels in each canway section 21, 21 and 22, 22 arranged to engage spaced points on a can and to propel the same, the star wheels in the inner canway section 21, 21 each having the reference numeral 23, and the star wheels in the outer canway section 22, 22 each having the reference numeral 24. It is noted that each one of the outer star wheels 24 has seven can pockets while each one of the inner star wheels 23 has five pockets with the pockets in star wheels 23 located a closer distance to its axis of rotation than are the pockets in star wheels 24, in which case, since all of the star wheels 23, 24 are driven at the same angular speed, a can travels at a greater rate of speed in the inner canway section 21, 21 than it does when traveling in the outer canway 22, 22 and is thus necessarily alternately accelerated and decelerated in its movement from the outer canway section 22 to the inner canway section 21 and back to the outer canway section 22 and so forth.

The pockets in the inner star wheels 23 are of the same size as those in the outer star wheel 24 and are so arranged with respect to one another that corresponding "spokes" thereof are brought into alignment when and as the wheels 23, 24 are rotated in which case such spokes cooperate with the propelled can and the can cooperates with the guideway to shift the propelled can from a pocket within star wheel 23 to a pocket within star wheel 24 and then back to a pocket in star wheel 23 and so forth. Because of this cooperation of the guideway in effecting this transfer between pockets in the star wheels and since the star wheels serve also as a guiding means, the can carrier 19, as referred to above, includes both the star wheels 23, 24 as well as the can end engaging strips 21, 22 having mounted respectively thereon the can retaining strips or rails 37, 38.

The canway 20 is stationarily mounted in the cylindrical cooker on a plurality of stationary inner and outer supporting members 25, 26 serving the dual function of canway section supports and steam tubes. These members 25, 26 extend longitudinally of the cylindrical cooker chamber with their opposite ends fastened to the spaced stationary header or end plates 28, 29 which serve to divide the cooker into three separate fluid tight compartments, namely: a star wheel drive compartment 30; a food treatment compartment 31; and a steam compartment or manifold 32.

As shown in Figures 4 and 7, these canway supporting members 25, 26 are hollow throughout a major portion of their length to serve as a conduit for the flow of steam supplied from the manifold 32 and steam inlet tube or intake 34 and each has a closed screw threaded end passing through an aperture in the header or end plate 28 upon which a fastening nut 35 is mounted. The other ends of the canway supporting members 25, 26 are each provided with a flange 36 fastened thereto by welding, shrink fitting or the like to form a stationary abutment thereon, the flange 36 being affixed near such ends to allow them to project through corresponding apertures in the header or end plate 29 where they may either make a snug fit with the header plate apertures or be welded or brazed thereto. Thus, steam may flow from the manifold 32 to the food treatment compartment 31 through the hollow supporting members 25, 26 each having a plurality of corresponding radial openings 27, 33 spaced along their lengths so that steam enters compartment 31 at a plurality of corresponding positions for achieving uniformity of temperature in compartment 31, it being noted at this time that radial openings 27, 33 are in alignment with corresponding openings in spacers 43, 44 on members 25, 26, respectively.

These supporting tubes 25, 26, as indicated in Figures 4 and 7, pass through the apertures in ears 41, 42 respectively on strips 21, 22, the ears 41 on the one hand and ears 42 on the other hand being maintained in predetermined spaced relationship by tubular spacers 43, 44, respectively, on tubes 25, 26.

The array of spacers 43, 44 and corresponding ears 41, 42 are maintained clamped between the stationary flanges 36 on supporting members 25, 26 and end plate 28 by the fastening nuts 35 with radial apertures in the tubular spacers 43, 44 and corresponding radial apertures in the tubular supports 25, 26 aligned as shown in Figure 7, to allow the passage of steam into the food treatment compartment 31. Preferably, these apertures are arranged so as not to direct a flow of steam directly onto the cans in the canway but in general to distribute the entering steam evenly throughout the compartment 31. After the heat in the steam is transferred to the cans and their contents, the resulting condensed steam or condensate falls to the bottom of compartment 31 from where it may be withdrawn through the connecting condensate tube 58, shut off valve 61 and a conventional type of condensate relief valve (not shown).

The inner and outer arcuate can retaining strips or rails 37, 38 may be fastened, along a line midway between their parallel edges, to their corresponding sections 21, 22 by deformable tongues 39 thereon passing through and clamping apertured portions of such rails with the integrally formed strip ears 41, 42 passing centrally through an enlarged slotted aperture 45 in such rails, the apertures 45 being enlarged to permit assembly over the radially extending spaced ears 41, 42 as the case may be, on strips 21, 22, respectively.

The inner star wheels 23 and outer starwheels 24 are mounted in predetermined spaced relationship with respect to one another and to each other on their drive shafts 46, 47, respectively with corresponding interposed spacers 48, 49 and with the ends of such shafts 46, 47 journaled for rotation, without end play on the spaced end plates 28, 29. These end plates 28, 29 thus not only serve as a dividing wall for compartments of the cooker but serve also as a support for the canway 20 and star wheel shafts 46, 47.

Each star wheel shaft 46, 47 is journaled in bearings 50, 51 mounted on the end plates 28, 29, respectively. The particular type of bearings 50, 51 and their supporting housings may take many different forms and shapes and those shown herein are exemplary of those and are preferred.

The bearing structure 51 on end plate 29 includes an outer ring housing member 52 having a fastening flange for releasably fastening it by bolts 53 thereto in a position determined by the centering pin 54 which is screw threadedly mounted on plate 29 with its conical pointed end extending upwardly into the cooperating conical opening in the end of the star wheel shaft to thereby accurately locate the same in assembly operations. The inner cylindrical member of the thrust ball bearing member 63 is recessed in the end of the star wheel shaft with the outer member of the bearing member 63 snugly received within the housing 52 and with a coil compression spring 55 normally compressing the packing 56 into engagement with the bearing member 63 to form a seal, the spring 55 being seated against the releasable split ring 57 disposed within an annular recess in the housing member 52.

The other bearing structure for the star wheel shaft on end plate 28 includes a needle bearing 50 having its inner annular rotatable portion recessed in a reduced section of the star wheel shaft and its outer movable member engaging both the outer cylindrical housing 59 and a downwardly extending ring on the cap 60 which is releasably secured to the housing 59 by bolts. The housing 59 has an annular flange, which in turn is releasably secured to the end plate 28 by bolts 62. In order to assure a steam-tight seal, packing 64 is pressed in the direction of the needle bearing 50 by the coil compression spring 65 having one of its ends pressing against the packing 64 and the other one of its ends pressing against the split retaining ring 66 releasably mounted in an annular groove in the housing member 59.

Each star wheel shaft 47, 48 has a longitudinally extending flat surface intermediate its ends as shown in Figures 5 and 7 which cooperates with a corresponding flat internal face on the star wheels and their tubular spacers threaded thereon to assure turning of these elements when and as the star wheel shafts are driven. In order to prevent longitudinal movement of the star wheels and their spacers on their corresponding drive shaft, the stack of assembled star wheels and spacers are maintained pressed as a unit against the shoulder 67 on the star wheel shaft by the fastening nut 69 threaded thereon.

The end plates 28, 29 are releasably secured by bolts 70 to the corresponding flange of the L-shaped ring members 71, 72, respectively, whose diameters are slightly less than the internal diameter of the cylindrical shell 73 housing the canway 20 and project therein, these ring members 71, 72 being secured to the shell 73 by rivets. These end plates 28, 29 are dished or cup-shaped as shown in Figure 4 and are normally covered by the releasable drive compartment cover 74 and releasable steam manifold cover 75, respectively, which are maintained in position by the same bolts 70.

The cylindrical shell 73 within which the canway 20 and star wheels 23, 24 are thus mounted is supported on four legs 77 which may be welded thereto to support the cylindrical shell with its axis extending in a horizontal direction.

The inlet valve 12 and transfer valve 16 releasably secured to the cylindrical shell 73 by bolts may both be of the type shown in the Thompson U. S. Patent 1,467,960, improved by inserting longitudinally extending spring actuated packing plates 79 in grooves on the outer ends of the rotatable valve teeth or fingers 80. These packing plates 79 cooperate with the inner cylindrical face of the valve housing 81 to form a steam tight seal. The desirability of such a steam tight seal, especially between the cooker and cooler, is made manifest upon the following considerations.

The inlet and transfer valves 12 and 16, respectively, are each releasably mounted on the cylindrical housing 73 by bolts passing through ears integrally formed thereon with their ends screw threaded in flanges on bracket members 83, 83a, respectively, which in turn are riveted to the cylindrical housing 73. The rotatable shaft of each one of these rotary valves 12, 16 has keyed thereto a corresponding sprocket wheel 84, 85. The sprocket wheel 84 is driven by a chain 86 passing over the sprocket wheel 87 whose shaft 88 is journaled for rotation on the cover member 74 (Figure 4), and coupled to the star wheel drive which in turn, as is described more fully later, is driven by the motor 89. The sprocket wheel 85 is driven by a chain 91 which also passes over the enlarged driving sprocket wheel 87; and in turn, the star wheel drive in the cooler 17 is driven by a chain 92 passing over the enlarged sprocket wheel 85.

The star wheel drive in the cooker 14 is driven by the chain 93 passing over a sprocket wheel on the output shaft of a gear reduction unit 90 which is driven by the electric motor 89 and over the sprocket wheel 94 whose shaft 95 is journaled for rotation as shown in Figure 10 on the cover 74 and has keyed thereon the internal driving sprocket 97 over which a driving chain 98 passes.

Chain 98, as shown in Figure 6, besides passing over the driving sprocket 97 passes, in turn, over the star wheel drive sprockets 100, 101 keyed respectively on the ends of the inner and outer star wheel drive shafts 46, 47, it being noted that one of the inner drive sprockets 100 has the driving shaft 88 extending upwardly through the cover plate 74 for imparting synchronous movement to the rotary elements of the inlet valve 12, transfer valve 16 and star wheel drive in the cooler 17, as explained previously. The shaft 88 may be an integral extension of the corresponding star wheel drive shaft 46.

The star wheel drive shafts in the cooker and cooler are thus intergeared so that the cans move through the canways in the cooker and cooler at exactly the same average linear speed. Also, the rotary inlet valve 12 and rotary transfer valve 16 are driven so that the pockets in each therein travel at exactly the same speed of movement as the average speed of the cans in the canway of the cooker and cooler.

In order to facilitate movements of the cans 10 from the cooker to the valve 16 they are brought into engagement with the stripper plate 109 which is inclined downwardly to direct such cans from the cooker canway outlet 15 into the opening 108 and into a pocket of the valve 16. Thus the cans are successively ejected from the cooker into the pockets of the valve 16 as it reaches the outlet of the cooker and move in the direction indicated by the arrows 110. The stripper plate 109 may have its downwardly extending end welded to the stationary housing of valve 16.

Each can is moved by the rotatable wheel of valve 16 in the valve casing through a short space between the outlet of the cooker and the inlet of the cooler at which latter point it is discharged by gravity forces acting thereon from the pocket of the valve wheel through the opening 112 in the valve casing into the canway in the cooler, and is then moved through the canway in the cooler to the outlet thereof by a carrier of the same type as is in the cooker.

Thus, the can cooking and cooling operations may be performed continuously and the cooking and cooling chambers may be tightly closed so that any desired pressure above atmospheric may be maintained therein which enables the cans to be cooked at any desired temperature.

In Figure 10 the star wheel drive shaft 95 may be journaled for rotation in the cover member 74 in many different manners and the one shown is exemplary of these. The outer end of the shaft 95 is journaled in the free end of bracket member 103 which is releasably secured to the cover member 74 while an intermediate portion of shaft 95 is journaled for rotation in the bearing housing 104 which has an outer closure member 105 arranged to maintain packing material 106 therebetween in contact with the rotatable shaft 95.

In a similar manner the drive shaft 88, as shown in Figure 4, may be journaled for rotation in the cover member 74 by affixing the bearing housing 107 on the cover with its closure member 108 arranged to press packing material therebetween in contact with the shaft 88.

It is apparent that the linear speed of a can through the cooker and cooler may be controlled by controlling the speed of the drive motor 89. For example, the speed of the driving motor 89 may be decreased by conventional means (not shown) when the contents, such as meats, require a longer cooking period.

In the modified arrangement shown in Figures 11–13, the can carrier 19 may be fabricated as shown, wherein, for the same purpose as the structure shown in Figures 7–9 inclusive, the inner and outer can-engaging strips 121, 122 are integrally formed and are a part of a split ring 114 of diameter substantially equal to but less than the internal diameter of the shell 73 with the split ends of such disc 114 maintained separated a distance slightly greater than the height of a can by spacers 43, 44 on combination canway supporting member and steam tubes 25, 26, respectively, to form one spiral convolution. Adjoining edges of adjoining discs 114 are butt welded or brazed together to form a helicoidal canway of a plurality of convolutions.

Inner and outer arcuate can engaging strips or rails 120, 121, respectively, may be fastened with their planes perpendicular to the plane of the disc 114 by welding or brazing or by tongue fastening means exemplified above in the arrangement shown in Figure 7 to provide a canway having a plurality of adjoining curved sections or portions in each convolution thereof.

The discs 114 are suitably apertured at 115, 116, for the passage therethrough of the inner and outer star wheel drive shafts 46, 47, respectively, having corresponding star wheels 23, 24 keyed thereon in the manner described above and for the same purpose to engage, guide and to propel cans in such curved sections or portions in each curved section of each convolution of the spiral canway.

The center of the ring 114 is cut out for imparting flexibility thereto in assembly of the plurality of discs and also to allow the passage of steam and condensate.

An advantage of this construction in Figures 11–13 is the relative ease of fabrication and assembly of the canway.

Also, because of this sectionalized canway structure it is possible to more easily control the temperature by preventing heat or steam localization which might otherwise cause "burn-on" of some food products, for example, condensed milk.

An important feature of the present arrangement is that, as indicated in Figure 3, the cans in their motion through one convolution in the can guideway are alternately rotated in opposite directions to thereby assure efficient agitation of the contents of the cans. For example, a can is rotated in the can guideway in the counter-clockwise direction, as indicated by the arrow 118 in the inner can guideway section 21, 21, while subsequently the same can as indicated by the arrow 119 is rotated in a clockwise direction, there being substantially no rotation of the can when and as the can leaves the inner can guideway section 21, 21 and enters the outer can guideway section 22, 22 in the two sections illustrated.

Thus, a can rotates in one or the other direction upon engagement thereof with the guide strips 21, 22 respectively, as indicated by the arrows in Figure 3, when it is being transferred from the outer section to the inner section, and vice versa. In some constructions, for example, as exemplified in my previously mentioned copending application, Serial No. 39,772, filed on even date as the present application, the cans are engaged and propelled by star wheels rotating in opposite directions as shown herein but substantially no rotative movement is imparted to the can.

While the cooker-cooler arrangement shown herein is of the horizontal type it is apparent that both the cooker and cooler are not dependent for their position on successful operation of the can carriers therein. In other words, the cooker and cooler shown herein may be supported with the axis of the cylindrical shell 73 extending vertically, as in a vertical type of cooker, and in such case the can carrier 19 is equally effective and operative to either gradually raise cans along the spiral convolutions or to gradually lower the same along the same spiral convolutions. As a matter of fact, the entire apparatus shown herein including the connecting transfer valve 16 may be operated as a vertical cooker and cooler arrangement upon orienting the apparatus as a unit, provided an inlet valve of the type shown in my above-mentioned copending application, Serial No. 39,772, and in the Thompson United States Patent No. 1,978,656 were substituted for the inlet valve 12 shown herein.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the character described, the combination comprising a chamber having an inlet and an outlet, and a helicoidal container guideway extending between said inlet and said outlet, said guideway having a tortuous serpentine, sinuous path which extends progressively inwardly and outwardly with respect to the central axis of said helicoidal guideway in one convolution thereof.

2. In apparatus of the character described, the combination comprising a chamber having an inlet and an outlet, and a helicoidal canway in communication with said inlet and outlet having a plurality of convolutions, each convolution of said canway having contiguous portions thereof which extend progressively inwardly and outwardly with respect to the central axis of said helicoidal canway.

3. In apparatus of the character described, the combination comprising a cylindrical chamber having an inlet and an outlet, a helicoidal guideway having a plurality of convolutions extending between said inlet and said outlet along the inside surface of said chamber, each convolution of said can guideway being serpentine, and a plurality of rotatable members, mounted in said spiral guideway and spaced unequal distances from the center of said chamber, arranged to engage and to propel containers along said guideway.

4. In apparatus of the character described, the combination comprising a cylindrical chamber having an inlet and an outlet, a helicoidal canway in said chamber and in communication with said inlet and outlet, said canway having a plurality of serpentine convolutions adjacent the inner surface of said cylindrical chamber and a plurality of star wheels mounted in said spiral canway and unequally spaced from the axis of said chamber, arranged to propel containers along said guideway.

5. In apparatus of the character described, the combination comprising a helicoidal guideway having a plurality of convolutions with contiguous portions of each convolution extending generally radially inwardly and outwardly with respect to the central axis of said guideway, and can engaging and propelling means located in the vicinity of each curved portion on said path to propel a container along the guideway.

6. In apparatus of the character described, a chamber having an inlet and outlet, means arranged to move containers in a helicoidal path between said inlet and said outlet, said means including a helicoidal guideway of a plurality of convolutions, each convolution comprising a curved sinuous path which extend progressively inwardly and outwardly with respect to the central axis of said guideway, and means at each curved section of said path arranged to engage and propel cans along said guideway.

7. In apparatus of the character described, a chamber having an inlet and an outlet, and a helicoidal can guideway extending generally in the horizontal direction and having a plurality of convolutions, each one of said convolutions comprising a plurality of curved sections, in adjoining relationship to form a serpentine path, said adjoining curved sections extend generally radially inwardly and outwardly with respect to the central axis of said can guideway.

8. In apparatus of the character described, a chamber having an inlet and an outlet, and a helicoidal can guideway extending between said inlet and outlet, said guideway comprising a plurality of adjoining curved sections to form a serpentine path which extends progressively inwardly and outwardly with respect to the central axis of said can guideway.

9. The invention defined in claim 8 characterized by means located in each one of said curved sections arranged to engage and propel cans along said guideway.

10. In apparatus of the character described, a cylindrical chamber having a can inlet and a can outlet, and a helicoidal can guideway extending between said inlet and said outlet adjacent the inner surface of said cylindrical chamber and having a plurality of convolutions, each convolution comprising a plurality of adjoining curved sections each located at different radii from the center of the chamber, and a star wheel located in each curved section also at different radial distances from the center of said cylindrical chamber arranged to engage and to propel cans along said guideway.

11. In apparatus of the character described, a chamber having an inlet and an outlet, a helicoidal can guideway extending between said inlet and said outlet and having a plurality of convolutions, each one of said convolutions comprising a plurality of curved sections with a supporting base for a can to rest thereon, said plurality of said curved sections comprising the curved sections which alternately converge generally inwardly and diverge generally outwardly with respect to the central axis of said can guideway and rotating means located in each one of said curved sections arranged to engage said means rotating in opposite directions in adjoining curved sections to propel cans along said guideway, and to reverse the direction of rotation of a can about its axis on said base in each section to thereby provide agitation of the contents of the can in its movement.

12. In apparatus of the character described, the combination comprising a chamber having an inlet and an outlet, a helicoidal canway having a plurality of convolutions, a container guideway extending between said inlet and said outlet, said guideway having a tortuous, serpentine, sinuous path in one convolution thereof, said path extending progressively inwardly and outwardly with respect to the central axis of said spiral canway, said guideway including a pair of spaced curved container end engaging strips, each having a corresponding inner arcuate can retaining rail member affixed thereto.

13. In apparatus of the character described, the combination comprising a chamber having an inlet and an outlet, a helicoidal container guideway extending between said inlet and said outlet, said guideway having a tortuous, serpentine, sinuous path in one convolution thereof, said guideway including a disk member split along a line extending generally radially thereof to define adjacent split ends, said disk having said adjacent split ends spaced a distance slightly greater than the height of a container, and a plurality of rail members affixed to opposite faces of said split disk member.

14. In apparatus of the character described, the combination comprising a cylindrical chamber having a can inlet and a can outlet, a helicoidal can guideway extending between said inlet and said outlet adjacent the inner surface of said cylindrical chamber and having a plurality of convolutions, each convolution comprising a plurality of adjoining curved sections each located at different radii from the center of the chamber, and oppositely rotating means located in adjacent curved sections at different radial distances from the center of said cylindrical chamber arranged to engage and to propel cans along said guideway and to simultaneously rotate a can in different directions about its axis in its passage from one curved section to an adjacent curved section, whereby agitation of the contents of the can is produced.

15. In apparatus of the character described, the combination comprising a chamber having an inlet and an outlet, a helicoidal container guideway extending between said inlet and said outlet, said guideway having a tortuous, serpentine, sinuous path in one convolution thereof, said guideway including a pair of oppositely disposed curved inner sections having affixed thereto a corresponding can end engaging strip, steam tubes extending through said chamber, each one of said can end engaging strips having an extension thereof mounted on a corresponding steam tube, and spacers mounted on said steam tube spacing adjoining oppositely disposed curved strips a distance slightly greater than the height of a container.

16. In apparatus of the character described, the combination comprising a chamber having an inlet and an outlet, a helicoidal container guideway extending between said inlet and said outlet, said guideway having a tortuous, serpentine, sinuous path in one convolution thereof, said guideway including a plurality of adjoining split disk members, each having affixed thereto a plurality of rail members, and steam tubes passing through said chamber having mounted thereon said split disk member with spacers thereon spacing adjacent ends of a split disk a distance slightly greater than the height of a container.

17. In apparatus of the character described, the combination comprising a chamber having an inlet and an outlet, a helicoidal container guideway extending between said inlet and said outlet, said guideway having a tortuous, serpentine, sinuous path in one convolution thereof, said guideway including a helicoidal strip with rail members affixed to opposite faces of such strip, steam tubes passing through said chamber having mounted thereon said helicoidal strip, and spacers on said steam tube spacing opposite faces of said strip a distance slightly greater than the height of a container.

18. In apparatus of the character described, the combination comprising a chamber having an inlet and an outlet, and a helicoidal container guideway extending between said inlet and said outlet, said guideway having a tortuous, serpentine, sinuous path in one convolution thereof, said guideway including a tortuous serpentine sinuous helicoidal strip having affixed thereto on its outer edge a container retaining strip with its plane perpendicular to the plane of the first mentioned strip.

19. In apparatus of the character described, the combination comprising a chamber having an inlet and an outlet, and a helicoidal container guideway extending between said inlet and said outlet, said guideway having a tortuous, serpentine sinuous path in one convolution thereof extend progressively inwardly and outwardly with respect to the central axis of said guideway, said guideway including a continuous ramp extending between said inlet and said outlet, for either raising or lowering a container in a continuous manner as the container is moved between said inlet and said outlet when the apparatus is used as either a vertical cooker or cooler.

20. In apparatus of the character described, the combination comprising a chamber having an inlet and an outlet, and a helicoidal container guideway extending between said inlet and said outlet, said guideway having a tortuous, serpentine, sinuous path in one convolution thereof which extends progressively inwardly and outwardly with respect to the central axis of said guideway, said guideway extending in a continuous path between said inlet and said outlet.

FRANK WILHELM KRUEGER.

REFERENCES CITED

The following references are of record in the file of this patent:

UNITED STATES PATENTS

| Number | Name | Date |
| --- | --- | --- |
| Re. 20,530 | Walker | Oct. 12, 1937 |
| 843,893 | Hawkins | Feb. 12, 1907 |
| 1,762,129 | Colbert | June 3, 1930 |
| 2,344,184 | Thompson | Mar. 14, 1944 |
| 2,363,818 | Thompson | Nov. 28, 1944 |